United States Patent
Fitzpatrick et al.

(10) Patent No.: US 9,542,670 B2
(45) Date of Patent: Jan. 10, 2017

(54) INFORMATION MANAGEMENT SYSTEMS WITH TIME ZONE INFORMATION, INCLUDING EVENT SCHEDULING PROCESSES

(71) Applicant: Microsoft Corporation, Redmond, WA (US)

(72) Inventors: Colin Fitzpatrick, Dublin (IE); Jeff Eldridge, Naas (IE); Mohamed Anas Abbar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/571,112

(22) Filed: Dec. 15, 2014

(65) Prior Publication Data
US 2015/0199654 A1    Jul. 16, 2015

Related U.S. Application Data

(63) Continuation of application No. 12/945,804, filed on Nov. 12, 2010, now Pat. No. 8,959,147, which is a
(Continued)

(51) Int. Cl.
*G06F 15/16* (2006.01)
*G06F 15/173* (2006.01)
*G06Q 10/10* (2012.01)

(52) U.S. Cl.
CPC ........ *G06Q 10/1095* (2013.01); *G06Q 10/109* (2013.01)

(58) Field of Classification Search
USPC .................. 709/206, 200, 224, 223, 246
See application file for complete search history.

(56) References Cited

U.S. PATENT DOCUMENTS

| 5,813,013 A | 9/1998 | Shakib et al. |
| 5,818,920 A * | 10/1998 | Rignell .................. H04M 3/38 368/10 |

(Continued)

FOREIGN PATENT DOCUMENTS

| JP | 1995-123167 A | 5/1995 |
| JP | 1996-263398 A | 10/1996 |

(Continued)

OTHER PUBLICATIONS

"Crystal Software: ""Time Zone Helper""", Internet Article, Oct. 21, 2004 (Oct. 21, 2004), XP002363877, Retrieved from the Internet: URL:http://web.archive.org/web/2004102121401 O/http:// www.datamystic.com/timezone.html [retrieved on Jan. 23, 2006]".

(Continued)

*Primary Examiner* — Jude Jean Gilles
(74) *Attorney, Agent, or Firm* — Anand Gupta; Tom Wong; Micky Minhas

(57) ABSTRACT

Information management systems with time zone information, including event scheduling processes are disclosed. One aspect of the invention is directed toward a computer-implemented scheduling method that can include identifying a difference between a participant time zone and a user time zone, reviewing availability information for the participant and/or one or more selected time preference periods for the participant, and selecting a time range for an event. The method can further include reviewing one or more selected time preference periods for the user. Another aspect of the invention is directed toward a computer-implemented method for associating time zone information with a contact in an information management program application that includes selecting a contact, analyzing contact information associated with the contact, and determining a time zone for the contact based on the analysis of the contact information.

39 Claims, 12 Drawing Sheets

Related U.S. Application Data continuation of application No. 11/009,950, filed on Dec. 10, 2004, now Pat. No. 7,856,483.

(56) References Cited

U.S. PATENT DOCUMENTS

| | | | |
|---|---|---|---|
| 5,845,257 A | 12/1998 | Fu et al. | |
| 5,960,406 A * | 9/1999 | Rasansky | G06Q 10/109 705/7.18 |
| 6,016,478 A | 1/2000 | Zhang et al. | |
| 6,016,487 A | 1/2000 | Rioux et al. | |
| 6,133,912 A * | 10/2000 | Montero | G06Q 30/02 348/558 |
| 6,141,005 A | 10/2000 | Hetherington et al. | |
| 6,198,696 B1 | 3/2001 | Korpi et al. | |
| 6,205,089 B1 | 3/2001 | Itoh | |
| 6,208,996 B1 | 3/2001 | Ben-Shachar et al. | |
| 6,216,100 B1 | 4/2001 | Meghdadi et al. | |
| 6,223,050 B1 | 4/2001 | Roberts, Jr. | |
| 6,266,295 B1 | 7/2001 | Parker et al. | |
| 6,363,352 B1 | 3/2002 | Dailey et al. | |
| 6,370,566 B2 | 4/2002 | Discolo et al. | |
| 6,505,167 B1 | 1/2003 | Horvitz et al. | |
| 6,629,129 B1 | 9/2003 | Bookspan et al. | |
| 6,647,370 B1 * | 11/2003 | Fu | G06F 15/0266 705/7.19 |
| 6,700,971 B1 | 3/2004 | Cohen et al. | |
| 6,760,723 B2 | 7/2004 | Oshinsky et al. | |
| 7,082,402 B2 | 7/2006 | Conmy et al. | |
| 7,118,530 B2 | 10/2006 | Hursh et al. | |
| 7,143,428 B1 * | 11/2006 | Bruck | H04N 5/44543 348/E5.105 |
| 7,188,073 B1 * | 3/2007 | Tam | G06Q 10/02 705/5 |
| 7,207,055 B1 | 4/2007 | Hendricks et al. | |
| 7,219,109 B1 | 5/2007 | Lapuyade et al. | |
| 7,305,491 B2 * | 12/2007 | Miller | G09B 19/18 368/185 |
| 7,382,773 B2 | 6/2008 | Schoeneberger et al. | |
| 7,856,483 B2 * | 12/2010 | Fitzpatrick | G06Q 10/1095 709/204 |
| 8,959,147 B2 * | 2/2015 | Fitzpatrick | G06Q 10/1095 370/229 |
| 2002/0038234 A1 | 3/2002 | Fu et al. | |
| 2002/0124000 A1 * | 9/2002 | Ooishi | G06F 17/30575 |
| 2003/0225732 A1 | 12/2003 | Chan et al. | |
| 2004/0093290 A1 | 5/2004 | Doss et al. | |
| 2004/0141508 A1 | 7/2004 | Schoeneberger et al. | |
| 2004/0168133 A1 | 8/2004 | Wynn et al. | |
| 2004/0203848 A1 | 10/2004 | Kumar | |
| 2004/0203894 A1 | 10/2004 | Watanabe et al. | |
| 2004/0210637 A1 | 10/2004 | Loveland | |
| 2004/0261013 A1 | 12/2004 | Wynn et al. | |
| 2005/0070282 A1 * | 3/2005 | Hinz | H04W 4/16 455/435.1 |
| 2005/0114191 A1 | 5/2005 | Atkin et al. | |
| 2006/0045029 A1 | 3/2006 | Ethier et al. | |
| 2006/0129626 A1 * | 6/2006 | Fitzpatrick | G06Q 10/1095 709/200 |
| 2006/0173975 A1 * | 8/2006 | Nose | G06F 8/65 709/219 |

FOREIGN PATENT DOCUMENTS

| | | |
|---|---|---|
| JP | 2003-150567 A | 5/2003 |
| JP | 2001-318175 A | 9/2004 |
| JP | 2004-260864 A | 9/2004 |

OTHER PUBLICATIONS

Anonymous: "User selection of time zone display", Research Disclosure, Mason Publications, Hampshire, GB, vol. 310, No. 27, Feb. 1990 (Feb. 1990), 1 page, XP007114716, ISSN: 0374-4353.

Nyarngonda Iu, Nagendra, "Lotus Notes Calendar and Scheduling Explained," Part I , Internel Article, "Online!", Oct. 18, 2004 http://www-128.ibm.com/developerworks/lotus/library/cs-pt1.

European Search Report for European Patent Application No. 05 II 1005, Microsoft Corporation, Feb. 9, 2006, 4 pages.

Office Action Received in India Palent Application No. 2926/DEU/2005, Mailed Date: Nov. 13, 2014, 2 Pages.

Dawson, F. and Stenerson, D., Internet Calendaring and Scheduling Core Object Specification (iCalendar), Standards Track, dated Nov. 1998.

Desruisseaux, B., Internet Calendaring and Scheduling Core Object Specification (iCalendar), Standards Track, dated Sep. 2009.

* cited by examiner

702 — Reviewing one or more selected time preference periods can include indicating one or more of the selected time preference periods for the participant in relationship to the participant time zone 704 — Reviewing one or more selected time preference periods can include indicating that the selected time range is during one or more of the selected time preference periods for the participant in relationship to the participant time zone or is not during the one or more selected time preference periods for the participant in relationship to the participant time zone 706 — Select at least one of a time preference period for the participant in relationship to the participant time zone and a time preference period for the user in relationship to the user time zone 708 — Indicate one or more selected time preference periods for the user in relationship to the user time zone 710 — Indicate that the selected time range is during one or more selected time preference periods for the user in relationship to the user time zone or is not during the one or more selected time preference periods for the user in relationship to the user time zone 712 — Suggest a time range based on at least one of the availability information for the participant, availability information for the user, the participant time zone, the user time zone, one or more selected time preference periods for the participant, and one or more selected time preference periods for the user

*FIG. 7*

| Identification | |
| Name | |
| First Phone Number | First Time Zone |
| Second Phone Number | Alternate Time Zone |
| First Address | First Time Zone |
| Second Address | Alternate Time Zone |
| | |
| Company | First Time Zone |
| Email | |

FIG. 11

| Identification | |
| Name | First Time Zone |
| First Phone Number | Second Time Zone |
| Second Phone Number | |
| First Address | |
| Second Address | |
| | |
| Company | |
| Email | |

FIG. 12

INFORMATION MANAGEMENT SYSTEMS WITH TIME ZONE INFORMATION, INCLUDING EVENT SCHEDULING PROCESSES

CROSS REFERENCE TO RELATED APPLICATION(S)

This application is a continuation application of U.S. patent application Ser. No. 12/945,804, filed on Nov. 12, 2010, and entitled "INFORMATION MANAGEMENT SYSTEMS WITH TIME ZONE INFORMATION, INCLUDING EVENT SCHEDULING PROCESSES," which is a continuation of U.S. Pat. No. 7,856,483, issued on Dec. 21, 2010, entitled "INFORMATION MANAGEMENT SYSTEMS WITH TIME ZONE INFORMATION, INCLUDING EVENT SCHEDULING PROCESSES," which are incorporated herein in their entirety by reference.

TECHNICAL FIELD

The following disclosure relates generally to information management systems with time zone information, including event scheduling processes having time zone information.

BACKGROUND

Today's global economy demands effective worldwide communication. For example, manufacturers often have suppliers located across the country and around the world. Timely and effective communication between the manufacturer and suppliers can be critical to business success. In other cases, companies often assign business projects to work groups with members physically located around the world. In some situations, the work group members can belong to different organizations and/or companies. As with manufacturers and suppliers, timely and effective communication can be critical to the success of the work group.

Telecommunications and other technologies, such as email, video-conferencing, and internet meetings provide timely and effective worldwide communication twenty-four hours a day, seven days a week. However, because of the difference in local time from one location to the next, certain forms of communication may not be appropriate during certain times of the day. For example, when the local time is 1700 hours on the west coast of the United States, it can be 0200 hours in Germany. Accordingly, when calling or scheduling a meeting (e.g., internet meeting or video conference) with a business associate, it has become increasingly important to consider the business associate's local time. However, it can be difficult to effectively and efficiently ascertain and/or track the different time zones for multiple business associates in today's complex business environment.

SUMMARY

The present invention is directed generally toward information management systems with time zone information, including event scheduling processes. One aspect of the invention is directed toward a computer-implemented scheduling method that includes identifying a difference between a participant time zone and a user time zone, reviewing availability information for the participant and/or one or more selected time preference periods for the participant, and selecting a time range for an event. The participant time zone is a time zone associated with a participant and the user time zone is a time zone associated with a user who is scheduling the event. The method can further include reviewing one or more selected time preference periods for the user. These time preference periods can include preferred times for scheduling events or periods of time during which the scheduling of events is discouraged. The method can also include coordinating the time range for the event with a user schedule and/or a participant schedule (e.g., annotating the user and/or participant schedule with the event during the selected time range).

Another aspect of the invention is directed toward a computer-implemented method for associating time zone information with a contact in an information management program application that includes selecting a contact, analyzing contact information associated with the contact, and determining a time zone for the contact based on the analysis of the contact information. For example, the contact's phone number, address, and/or affiliations can be used to determine or suggest a time zone that can be associated with the contact. The method can further include storing the time zone for the contact. The time zone information for the contact can be used to aid a user in scheduling an event.

BRIEF DESCRIPTION OF THE DRAWINGS

FIG. 7 is a flow diagram illustrating still further embodiments of the computer-implemented scheduling process shown in FIG. 2.

FIG. 11 is a partially schematic illustration of an information management program application display of contact information in accordance with embodiments of the invention.

FIG. 12 is a partially schematic illustration of another information management program application display of contact information in accordance with other embodiments of the invention.

DETAILED DESCRIPTION

The following disclosure describes several embodiments of information management systems with time zone information, including event scheduling processes. Specific details of several embodiments of the invention are described below to provide a thorough understanding of such embodiments. However, other details describing well-known structures and routines often associated with computer-based information management systems are not set forth below to avoid unnecessarily obscuring the description of the various embodiments. Additionally, several flow diagrams and processes having process portions are described to illustrate various embodiments of the invention. It will be recognized, however, that these process portions can be performed in any order, and are not limited to the order described herein with reference to particular embodiments. Furthermore, those of ordinary skill in the art will understand that the invention may have other embodiments that include additional elements or lack one or more of the elements described below with reference to FIGS. 1-13.

Figure 1:
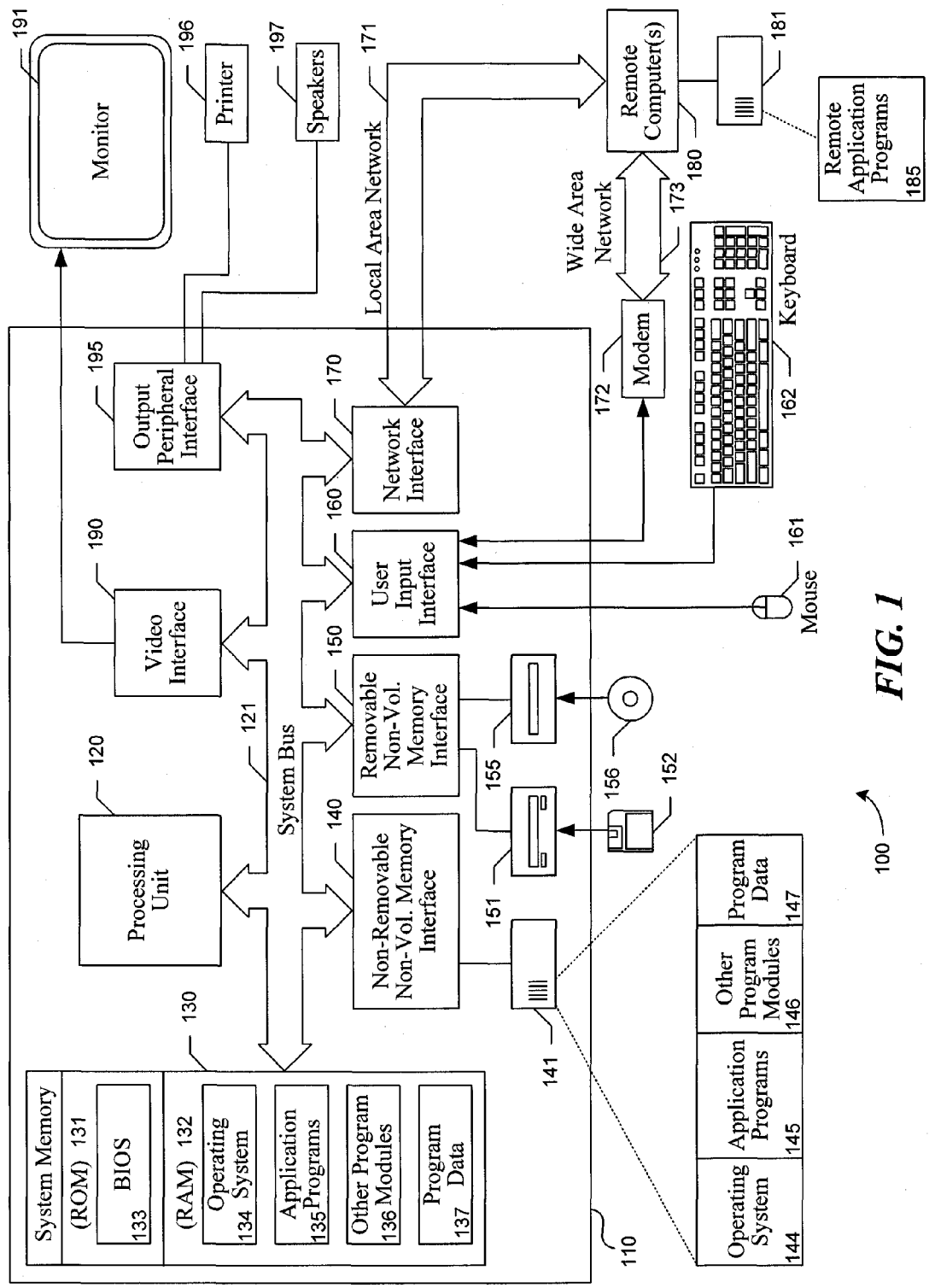
FIG. 1 is a partially schematic illustration of a computing system suitable for implementing embodiments of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structure, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media. It will be recognized that any or all of the process portions described herein can be stored on computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements with computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Certain embodiments of the present invention are directed toward computer-implemented scheduling processes using an information management system application, for example, using "Microsoft® Outlook®," available from the Microsoft Corporation of Redmond, Wash. Many information management systems applications or personal information management system applications can store contacts (e.g., names of people or organizations) and contact information. Contact information can include the contacts' names, identification (e.g., identifying information regarding how the contacts are listed or identified), physical addresses, phone numbers, email addresses, and/or affiliations (e.g., an organization, a company, and/or a portion of the company to which the contact belongs or works). Additionally, many information management system applications have note, task, email, and/or calendar functions. In some cases, the calendar function can be used to aid in scheduling meetings or other events.

When scheduling an event (e.g., a phone call, video conference, and/or internet meeting) it can be important to consider the local time for each of the individuals involved. For example, if one individual is on the west coast of the United States and another individual is in Germany, the local time for each individual can differ by nine hours. This could result in a video conference being scheduled for 1500 (e.g., 1500 hours) on the west coast of the United States and for 0000 for the individual in Germany.

Figure 2:
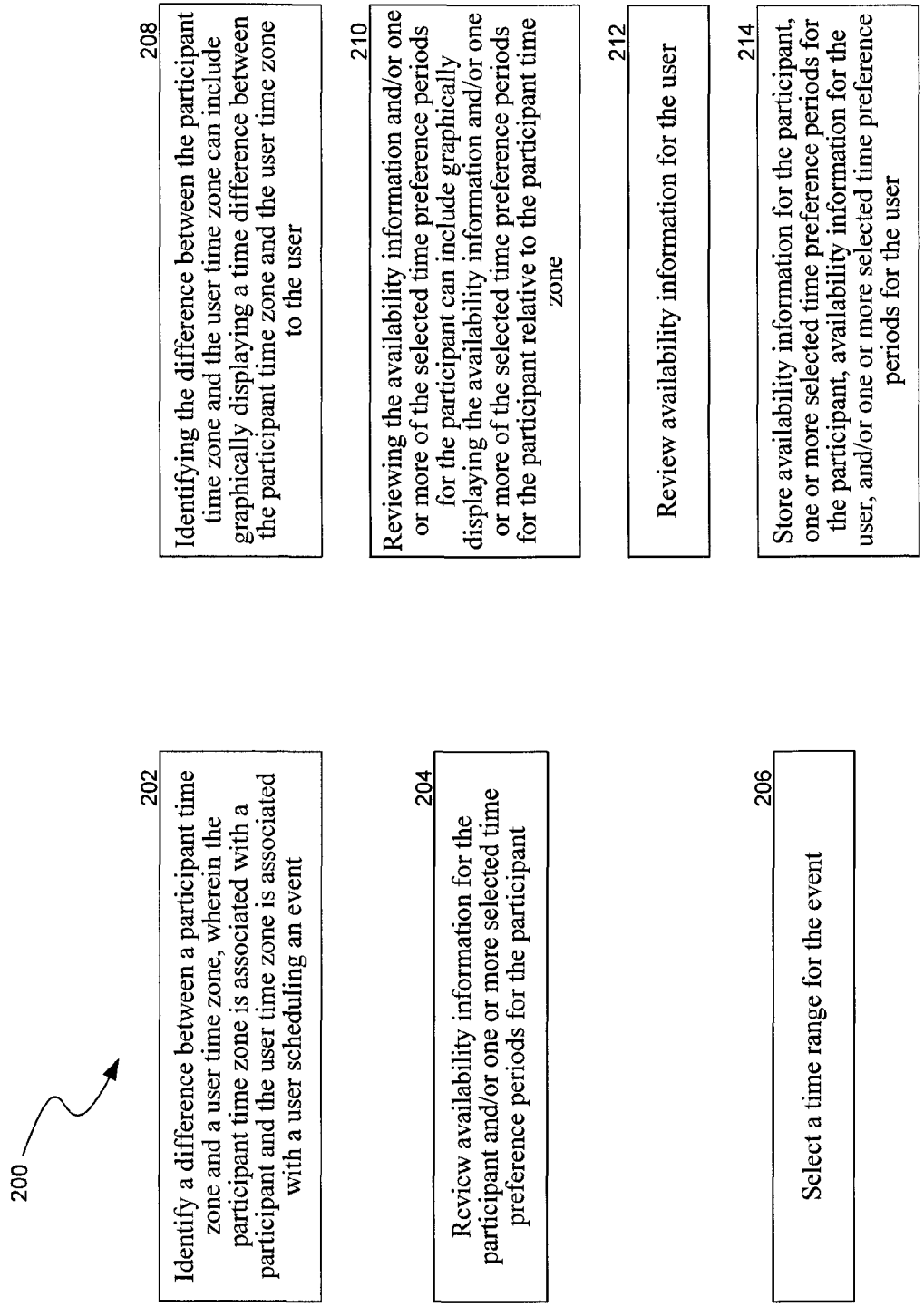
FIG. 2 is a flow diagram illustrating a computer-implemented scheduling process in accordance with embodiments of the invention.

Accordingly, FIG. 2 illustrates a computer-implemented scheduling process 200 that includes identifying a difference between a participant time zone and a user time zone, wherein the participant time zone is associated with a participant and the user time zone is associated with a user scheduling an event (process portion 202), reviewing availability information for the participant and/or one or more selected time preference periods for the participant (process portion 204), and selecting a time range for the event (process portion 206). Availability information can include when an individual (e.g., participant) is available to potentially attend an event (e.g., free) and/or when the individual is scheduled for other events, tentatively scheduled for other events, and/or otherwise busy. A selected time preference period can include time periods during which events should be scheduled (e.g., normal business hours) and/or time periods during which the scheduling events should be avoided (e.g., during the middle of the night). A time range can include a single time (e.g., an event scheduled for 1315 in the user time zone) or a range of time during which an event is expected to occur. This process 200 can allow the user to be aware of the participant time zone and the associated local time to determine whether the selected time range falls during an acceptable portion of the day for the participant (e.g., during normal business hours).

As discussed above, the process portions can be accomplished in any order. For example in one embodiment, the process portions can be accomplished in the order they are listed. In another embodiment, the availability of the participant and/or one or more of the selected time preference periods for the participant can be reviewed (process portion 204), the time range for an event can be selected (process portion 206), and then the difference between the participant time zone and a user time zone can be identified (process portion 202). If the selected time range is unsuitable based on the difference between the time zones, the user can then schedule the event for another time range by repeating the process.

In certain embodiments, as discussed below with reference to FIGS. 5 and 6, identifying the difference between the participant time zone and the user time zone (process portion 202) can include graphically displaying a time difference between the participant time zone and the user time zone to the user (process portion 208). In other embodiments, identifying the difference between the participant time zone and the user time zone (process portion 202) can be accomplished in other ways. For example, in certain embodiments the time difference can be shown numerically as a number of hours ahead or behind the user time zone or as the difference between local time and Universal Coordinated Time.

In other embodiments, as discussed below with reference to FIGS. 5 and 6, reviewing availability information and/or one or more selected time preference periods for the participant can include graphically displaying the availability information and/or one or more of the selected time preference periods for the participant relative to the participant time zone (process portion 210). In other embodiments, reviewing availability information and/or one or more selected time preference periods for the participant (process portion 204) can be accomplished in other ways. For example, in certain embodiments the availability information and/or one or more selected time preference periods for the participant can be displayed in a list. In certain embodiments, the process can further include reviewing availability information and/or one or more selected time preference periods for the user (process portion 212), for example, when the user will participate in the event. Availability information for the participant, selected time preference period(s) for the participant, availability information for the user, and/or selected time preference period(s) for the user can be stored in a computing system environment (e.g., the computing system environment 100 shown in FIG. 1), including on the user's computer, the participant's computer, and/or on a server (process portion 214).

Figure 3:
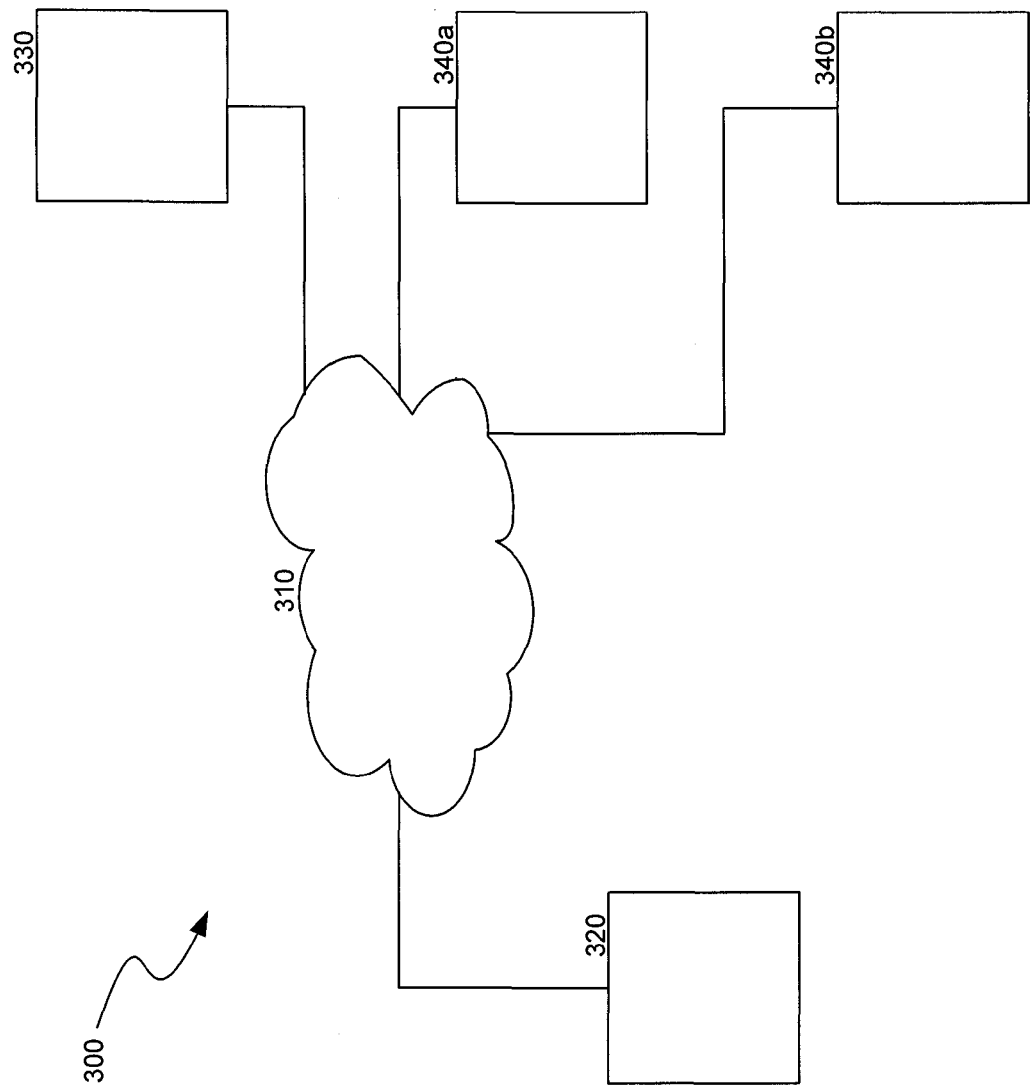
FIG. 3 is a partially schematic diagram of a computing system environment, similar to the computing system environment shown in FIG. 1, having multiple computers suitable for implementing embodiments of the invention.

This general process can be used for any number of participants. For example, as shown in FIG. 3, a computing system environment 300 (similar to the computing system environment 100, shown in FIG. 1) includes a communication network 310 that connects a user's computer 320, a first participant's computer 330, a first additional participant's computers 340*a*, and a second additional participant's computer 340*b*. The user can be associated (e.g., located or based in) a first time zone (e.g., U.S. Pacific Time). The first participant can be associated with a second time zone (e.g., U.S. Eastern Time). The first additional participant can be associated with a third time zone (e.g., U.S. Central Time) and the second additional participant can be associated with a fourth time zone (e.g., U.S. Mountain Time). In other embodiments, there can be more or fewer additional participants.

Figure 4:
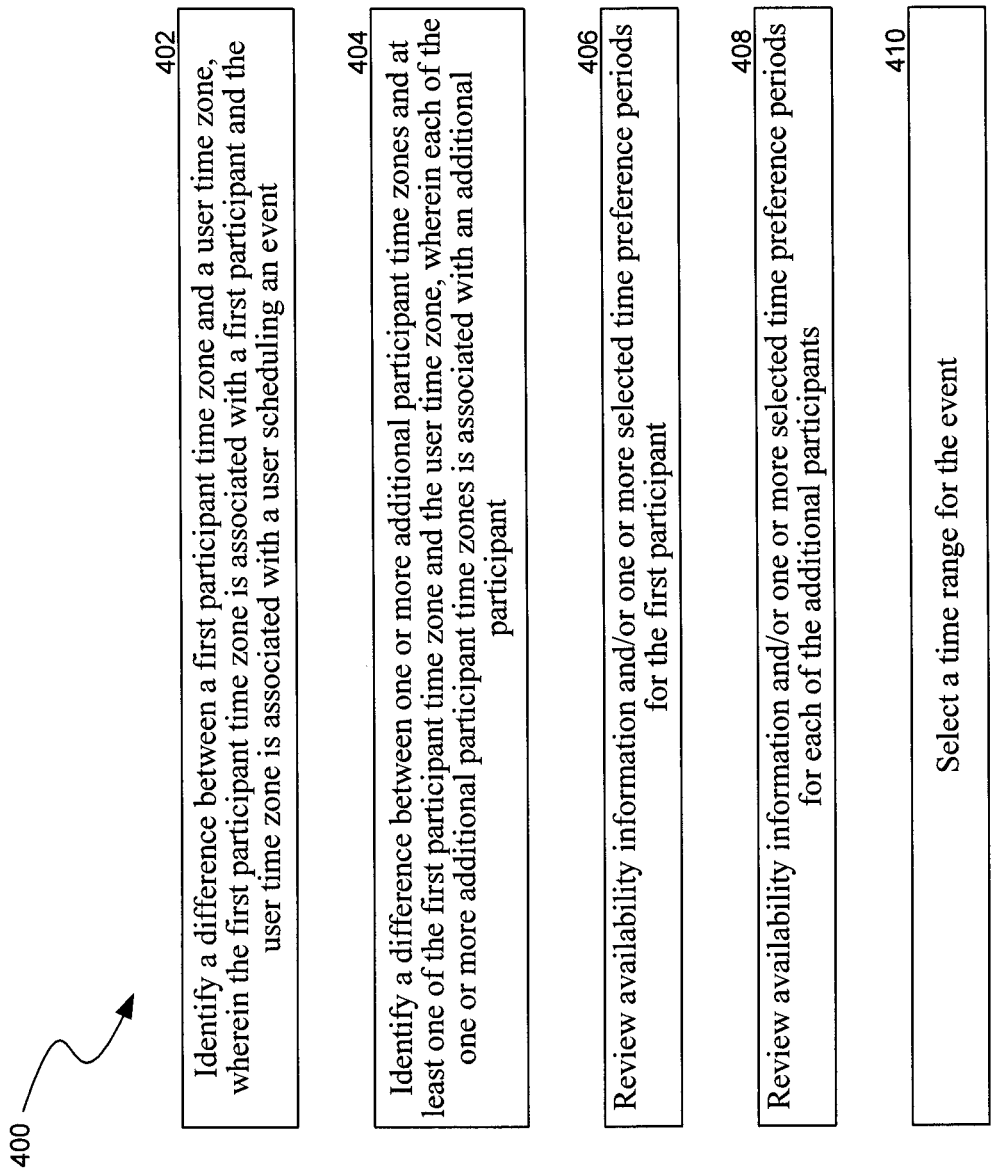
FIG. 4 is a flow diagram illustrating a computer-implemented scheduling process in accordance with further embodiments of the invention.

Accordingly, as illustrated in FIG. 4, a computer-implemented scheduling method 400 can include identifying a difference between a first participant time zone and a user time zone, wherein the first participant time zone is associated with a first participant and the user time zone is associated with a user scheduling an event (process portion 402). The method can further include identifying a difference between one or more additional participant time zones at least one of the first participant time zone and the user time zone, wherein each of the one or more additional participant time zones is associated with an additional participant (process portion 404). The method can still further include reviewing availability information and/or one or more selected time preference periods for the first participant (process portion 406), reviewing availability information and/or one or more selected time preference periods for each of the additional participants (process portion 408), and selecting a time range for the event (process portion 410).

Figure 5:
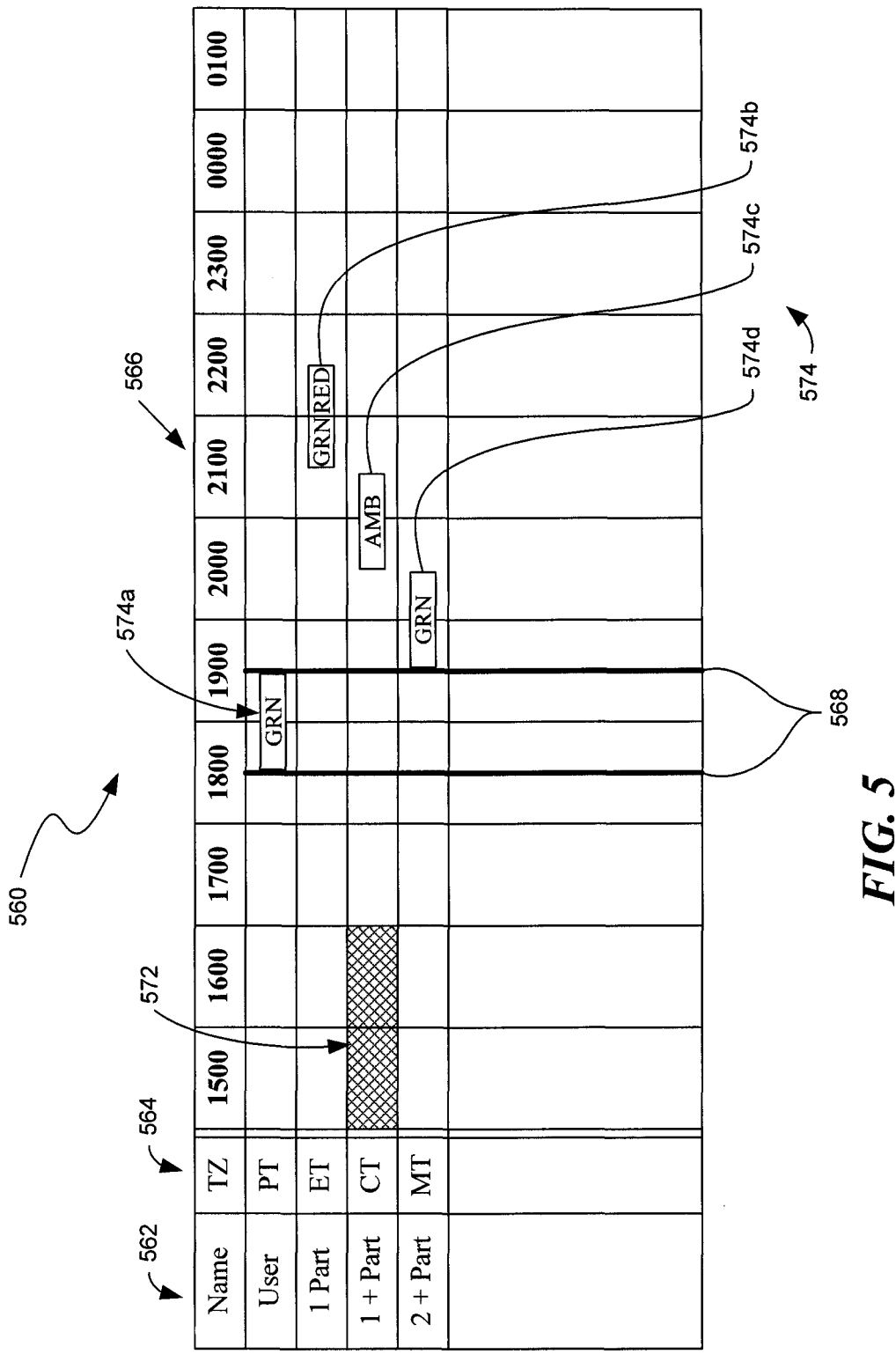
FIG. 5 is a partially schematic illustration of a display identifying a difference between participant time zones and a user time zone in accordance with embodiments of the invention.

FIG. 5 is a partially schematic illustration of a display 560 identifying a difference between participant time zones and a user time zone in accordance with embodiments of the invention. In FIG. 5, the user and participant identifications 562 are listed along a side of the display 560. The user and participant time zone identifications 564 are listed next to the user and participant identifications 562. This can serve to identify a difference in time zones between the user and/or participants. A time scale 566 is listed across the top of the display. The difference between morning and afternoon can be indicated by various methods, including color coding, shading, the use of textures, the use of symbols, and/or displaying the time in a twenty-four hour format. In the illustrated embodiment, the time is displayed in the twenty-four hour format.

Various methods (e.g., using shading, using texturing, using symbols, using colors, and/or using lists) can be used to show availability information for a participant or user. In the illustrated embodiment, a non-availability symbol 572 shows that the first participant (1 PART) is unavailable between 1500 and 1700 Pacific Time. Accordingly, the user knows not to schedule an event between 1500 and 1700 Pacific Time if the first participant is required to participate in the event. Various levels of availability can also be shown. For example, in one embodiment a selected symbol can indicate that the user or participant is tentatively unavailable and a different symbol can be used to show the user or participant is unavailable. In the illustrated embodiment, the user and participant availabilities are all shown relative to the user's time zone (e.g., the Pacific Time Zone). Other embodiments can have other arrangements, as discussed below in further detail.

The selected time range bars 568 indicate a time range of 1830 to 1930, relative to the user's time zone (e.g., Pacific Time), has been selected. Because the non-availability symbols 572 are shown with reference to the user time zone and no non-availability symbols appear within the confines of the scheduling bars 568, neither the user nor participants have indicated non-availability during the selected time range. The time range can be manually selected by the user based on the availability of the participants and/or the user, or automatically suggested (e.g., an executable instruction configured to choose the first available time where all the participants or all the participants and the user are available).

Time range indicators 574 show the time difference between the time zones of the user and the participants. For example, the user's time range indicator 574*a* is shown between the time range bars 568 indicating a time range of 1830 to 1930 in the user time zone. The first participant's time range indicator 574*b* indicates that the selected time (1830 to 1930 Pacific Time) falls between 2130 and 2230 local time in the Eastern Time Zone. Similarly, the selected time (1830 to 1930 Pacific Time) falls between 2030 and 2130 in the Central Time Zone as indicated by the first additional participant's time range indicator 574*c* and between 1930 and 2030 in the Mountain Time Zone as indicated by the second additional participant's time range indicator 574*d*.

If a participant were associated with the same time zone as the user, the display would show that the participant time zone identifier 564 is the same as the user and the participant's time range indicator 574 would be shown between the time range bars 568, indicating that the time difference between the user time zone and the participant time zone is zero hours. In certain embodiments, the time zones are depicted only by the time differences depicted by the time range indicators 574 and the time zone identifiers 564 are not shown. In other embodiments, the display of the difference between participant time zones and the user time zone can have other arrangements.

Figure 6:
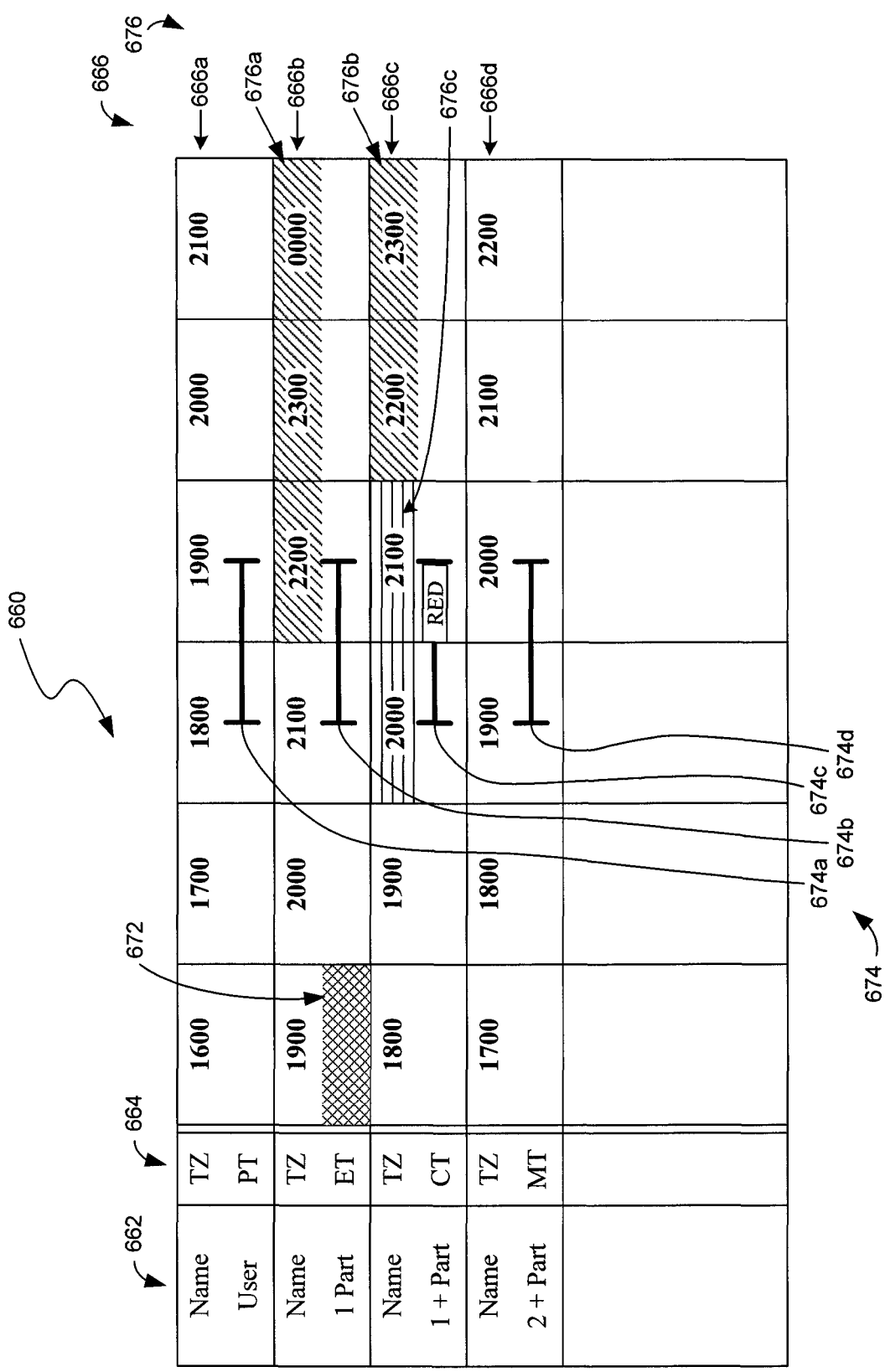
FIG. 6 is a partially schematic illustration of a display identifying a difference between participant time zones and a user time zone in accordance with other embodiments of the invention.

For example, FIG. 6 illustrates a display 660 in accordance with another embodiment of the invention. In FIG. 6, the user and participant identifications 662 are listed along a side of a display 660. The user and participant time zone identifiers 664 are listed beside the user and participant identifications 662 and can identify a difference between the user time zone and/or the participant time zones.

In FIG. 6, the local time for each time zone is displayed relative to the other time zones by the time scales 666. For example, the user's time scale 666a represents the time in the user time zone and runs from 1600 to 2200. During the same period, the first participant's time scale 666b runs from 1900 to 0100 indicating the corresponding local time in the first participant time zone. Similarly, the first additional participant's time scale 666c runs from 1800 to 0000 indicating the corresponding local time in the first additional participant time zone and the second additional participant's time scale 666d runs from 1700 to 2300 indicating the corresponding local time in the second additional participant time zone. In other embodiments, the time zones are depicted only by the time differences depicted on the time scales 666 and the time zone identifiers 664 are not shown.

Accordingly, a user can identify a time difference between the various time zones by examining the display 660. Because the local time for each time zone is displayed, availability information can be shown in local time for each participant, as illustrated by the non-availability symbol 672 shown between 1900 and 2000 Eastern Time for the first participant. From examining the display, the user can determine that the non-availability for the first participant corresponds to 1600 to 1700 in the user time zone.

The selected time range is indicated for the user and participants by time range indicators 674. The user time range indicator 674a shows that the selected time range runs between 1830 and 1930 in the user time zone. Correspondingly, the first participant's time range indicator 674b shows that the selected time range runs between 2130 to 2230 in the first participant time zone, the first additional participant's time range indicator 674c shows that the selected time range runs between 2030 and 2130 in the first additional participant time zone, and the second participant's time range indicator 674d shows that the selected time range runs between 1930 and 2030 in the second additional participant time zone. Because the time zones are aligned to show the corresponding local time for a selected time range, all of the time range indicators 674 are aligned vertically on the display. In other embodiments, the display can have other arrangements, for example the time range bars 568, shown in FIG. 5, can also be used with the display shown in FIG. 6.

As shown in process portion 204 (shown in FIG. 2), when scheduling an event, it is sometimes desirable to consider time preference periods in addition to, or in lieu of, availability information. Time preference periods can include an individual's (e.g., a participant's) preference or expected preference regarding periods of time during which scheduling should occur or should be avoided. For example, it may be preferred to schedule events during normal business hours and to avoid scheduling events in the middle of the night. In certain embodiments these time preferences can be selected by default, selected by the user, and/or selected by each participant (e.g., selected by the participant and included with the participant's availability information and/or contact information). In some embodiments, the user can override or adjust the preferences (e.g., when a selected time preference period is automatically suggested or selected by default). In certain embodiments, participants can have multiple time preference periods and/or different levels of time preference periods. For example, a participant can have a first time preference period during which the scheduling of events will not be accepted (e.g., during sleeping hours) and a second time preference period during which the scheduling of events is discouraged (e.g., outside of normal business hours, but will likely be accepted).

Accordingly, as shown in FIG. 7, in certain embodiments reviewing one or more selected time preference periods of the participant (process portion 204 in FIG. 2) can include indicating a selected time preference period for the participant in relationship to the participant time zone (process portion 702). In other embodiments, reviewing one or more selected time preference periods for the participant can include indicating that the selected time range is during one or more selected time preference periods for the participant in relationship to the participant time zone or is not during the one or more selected time preference periods for the participant in relationship to the participant time zone (process portion 704). In still other embodiments, the computer-implemented scheduling process shown in FIG. 2 can include selecting a time preference period for the participant in relationship to the participant time zone and/or a time preference period for the user in relationship to the user time zone (process portion 706). For example, as discussed above, a time preference period can be selected by default, by the participant, or by the user.

In yet other embodiments, the process can include reviewing one or more selected time preference periods for the user by indicating a selected time preference period for the user in relationship to the user time zone (process portion 708). In still other embodiments, the process can include reviewing one or more selected time preference periods for the use by indicating that the selected time range is during one or more selected time preference periods for the user in relationship to the user time zone or is not during the one or more selected time preference periods for the user in relationship to the user time zone (process portion 710). In yet another embodiment, the process can include suggesting a time range based on the availability information for the participant, availability information for the user, the participant time zone, the user time zone, one or more selected time preference periods for the participant, and/or one or more selected time preference periods for the user (process portion 712).

For example, referring back to FIG. 6, multiple time preference periods 676 are shown. In FIG. 6, the first participant has a "no schedule" time preference period 676a shown between 2200 and 0100 local time. The first additional participant has a "no schedule" time preference period 676b shown between 2200 and 0000, and a time preference period 676c shown between 2000 and 2200 during which the scheduling of events is discouraged. Time preference periods can be indicated via various methods, including the use of color, the use of shading, the use of symbols, the use of textures, and/or the use of lists.

A portion of the first participant's time range indicator 674b is shown in red because it extends into the first participant's "no schedule" time preference period 676b. In other embodiments, other methods can be used to indicate the time range indicator 674 extends into a time preference period 676 (e.g., symbols, textures, shading, and/or alphanumeric messages). In FIG. 6, the first additional participant's time range indicator 674c is unchanged even though it extends through the first additional participant's time preference period 676c during which the scheduling of events is discouraged.

In still other embodiments, other methods can be used to indicate time preference periods. For example, referring back to FIG. 5, a portion of the first participant's time range indicator 574a is red, indicating that the time range indicator 574b extends into the first participant's "no schedule" time preference period. The first additional participant time range indicator 574c is amber, indicating that it extends through the first additional participant's time preference period during which the scheduling of events is discouraged. Accordingly, once a time is selected for an event, the user can have an indication of a participant's time preference periods.

Further embodiments of the invention are discussed below in detail. Many of these embodiments are discussed with reference to a user and a participant. However, it will be recognized that many or all of these embodiments can be applied to scheduling multiple participants, as discussed above.

Figure 8:
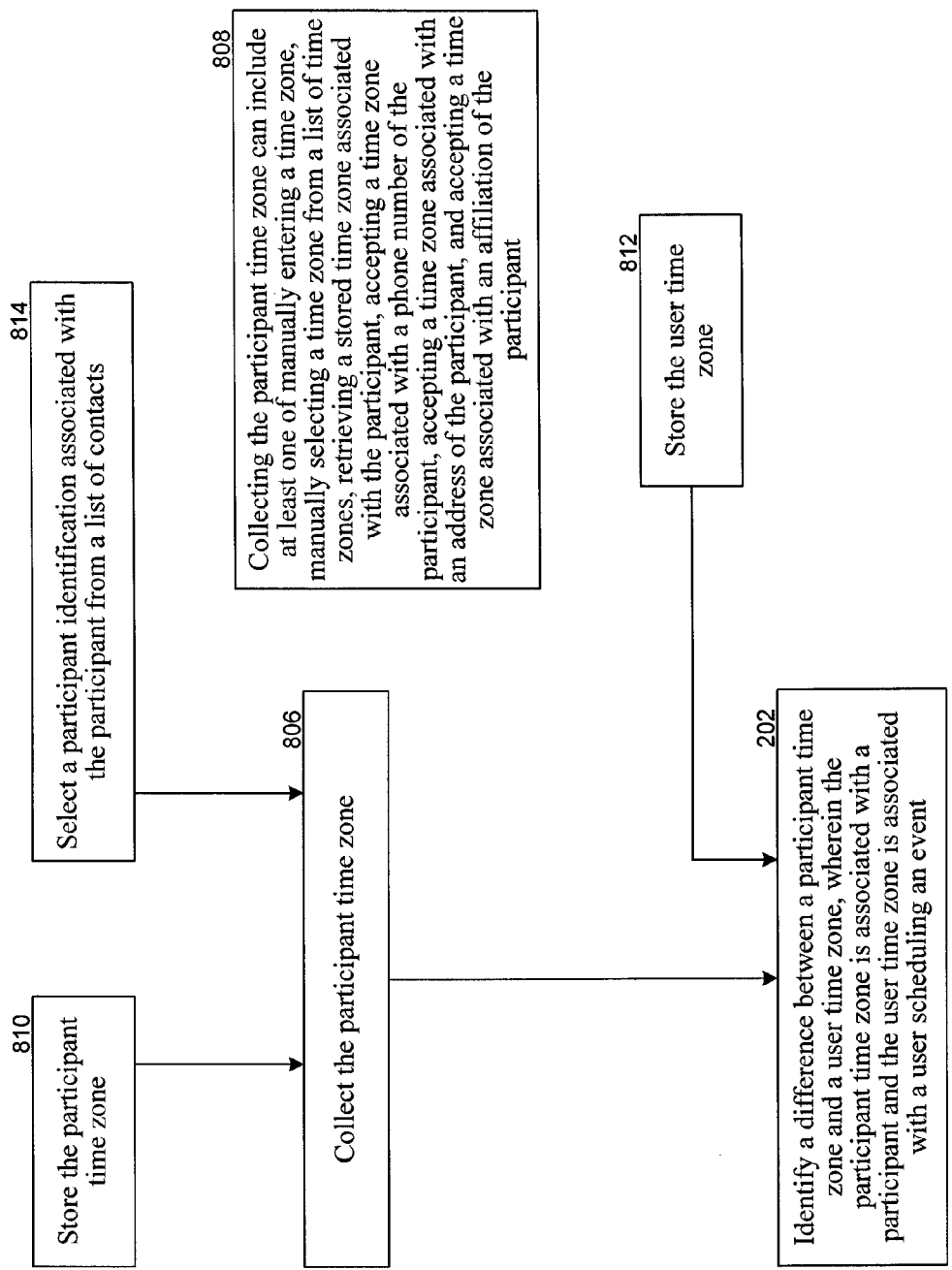
FIG. 8 is a flow diagram illustrating yet other embodiments of the computer-implemented scheduling process shown in FIG. 2.

FIG. 8 is a flow diagram illustrating further embodiments of the computer-implemented scheduling process shown in FIG. 2. The scheduling process, shown in FIG. 2, can also include collecting the participant time zone (process portion 806). The collected participant time zone can then be compared to the user time zone to identify a difference between the participant time zone and the user time zone (process portion 202). Collecting the participant time zone can include at least one of manually entering a time zone, manually selecting a time zone from a list of time zones, retrieving a stored time zone associated with the participant, accepting a time zone associated with a phone number of the participant, accepting a time zone associated with an address of the participant, and accepting a time zone associated with an affiliation of the participant (process portion 808).

The scheduling process can further include storing the participant time zone (process portion 810) so that it can be retrieved and compared to the user time zone. The time zone information can be stored anywhere in a computing system environment (e.g., the computing system environment 100, shown in FIG. 1), including on a remote computer, in a system memory, and/or on a computer storage medium. For example, in one embodiment, the time difference between Universal Coordinated Time and a local time associated with the participant, stored on a participant's remote computer, can be communicated to the user's computer and used to determine a participant time zone. Similarly, the process can include storing the user time zone (process portion 812) for use in identifying a difference between the participant time zone and the user time zone.

In certain embodiments, the user can select a participant identification (e.g., a name, address, and/or email) from a list of contacts (process portion 814). The participant time zone can be stored as part of the contact information or be associated with a portion of the contact information (e.g., associated with the contact information, but be stored elsewhere in the computing system). Accordingly, when the contact is selected, the participant time zone can be identified and compared to the user time zone to identify the difference between the two.

To aid in time identification, a computer-implemented process for associating time zone information with a contact in an information management program application can be used to identify a time zone when the contact information for a contact or contact identification is entered into the information management program application. As discussed above, the time zone can be stored as part of the contact information or associated with the contact information and recalled at a later time if the contact is selected as a participant. In another embodiment, the process can use existing contact information to aid the user in determining a time zone for a participant identification selected from a contact list (e.g., when the participant identification is selected during a scheduling process). In still further embodiments, the process can be used to aid a user in determining a user time zone (e.g., when the user enters user contact information into an information management program application).

Figure 9:
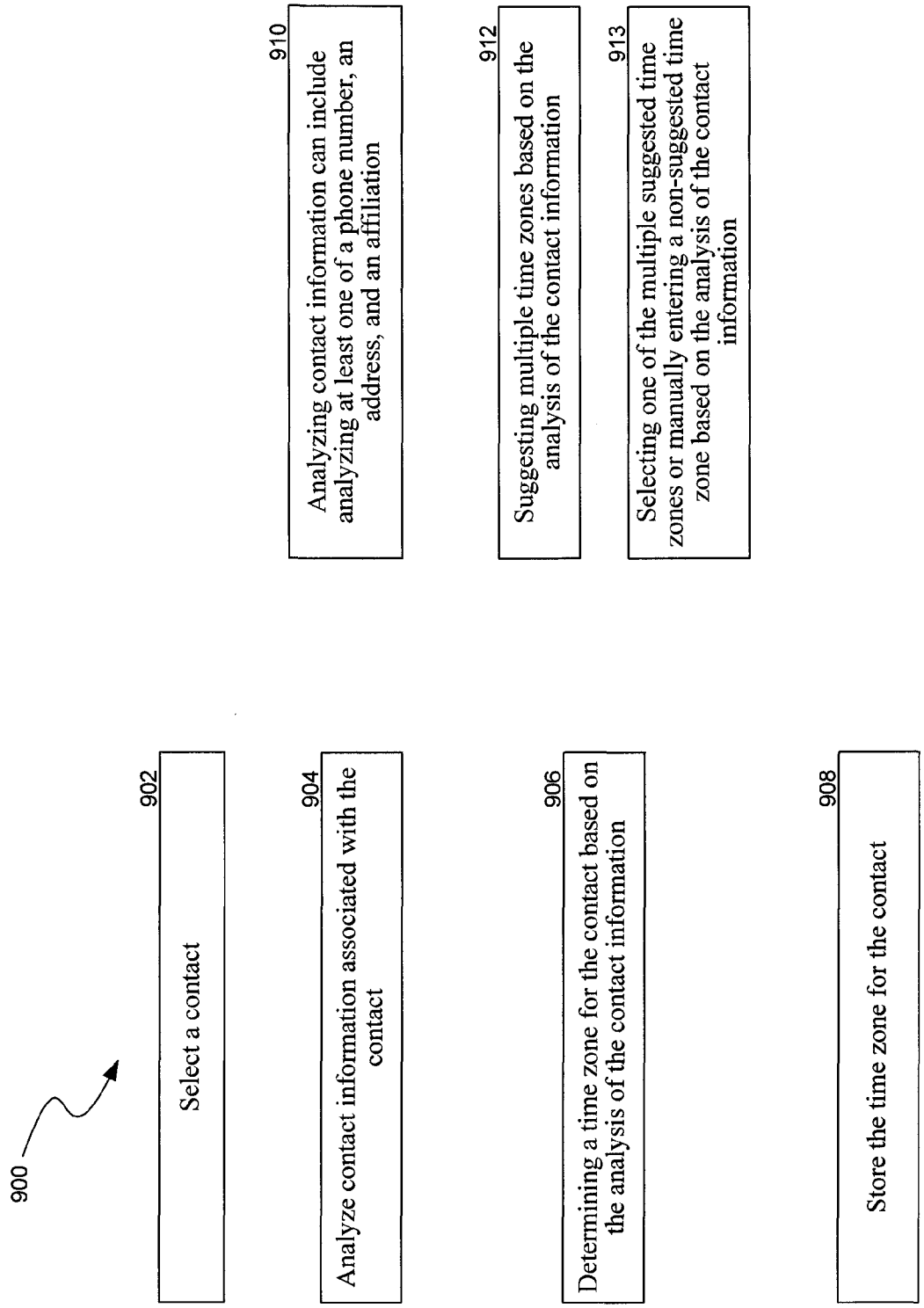
FIG. 9 is a flow diagram illustrating a computer-implemented process for associating time zone information with a contact in an information management program application in accordance with certain embodiments of the invention.
Figure 10:
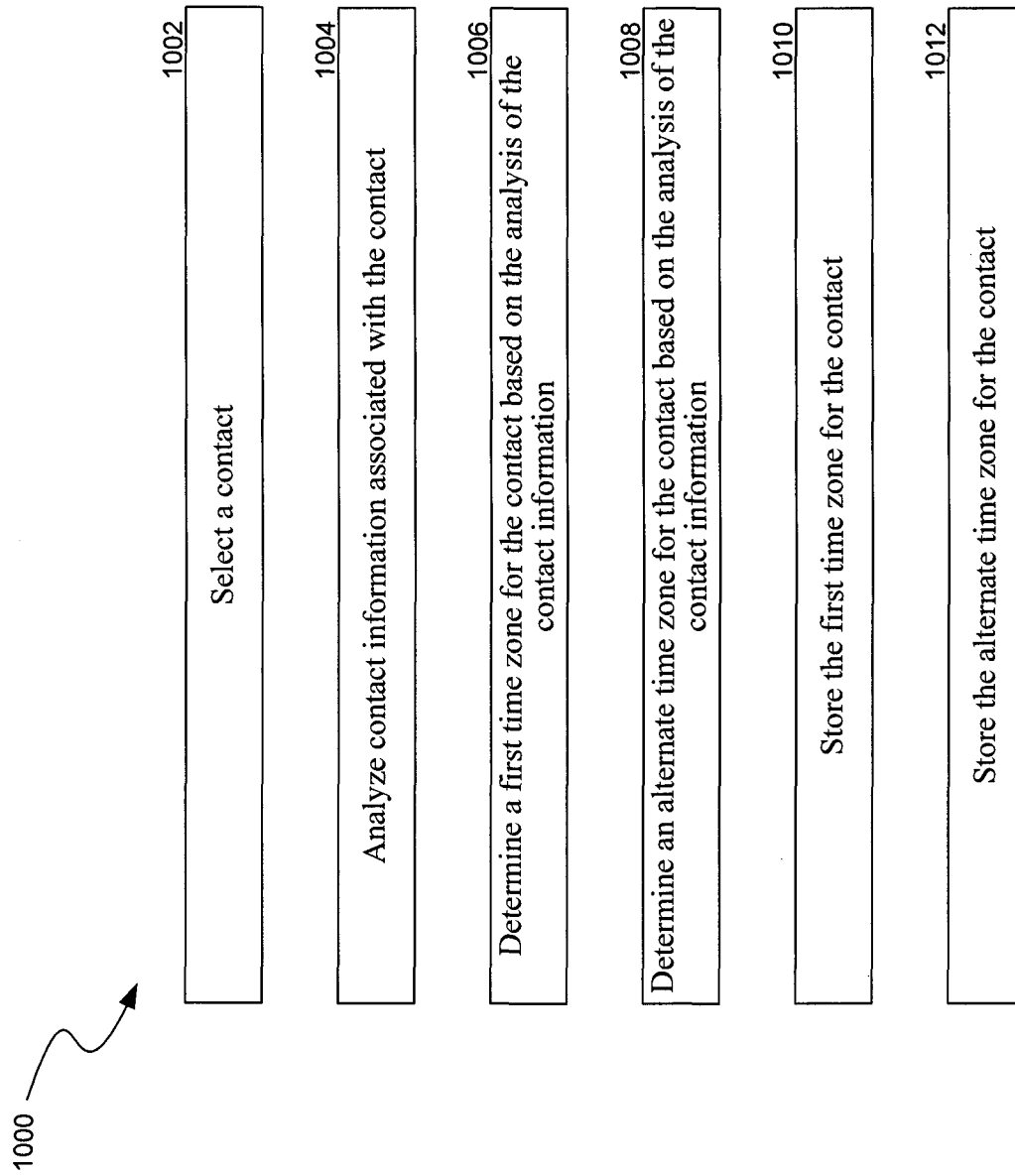
FIG. 10 is a flow diagram illustrating a computer-implemented process for associating time zone information with a contact in an information management program application in accordance with other embodiments of the invention.

FIG. 9 is a flow diagram illustrating a computer-implemented process 900 for associating time zone information with a contact in an information management program application in accordance with embodiments of the invention. The process 900 can include selecting a contact (process portion 902) and analyzing contact information associated with the contact (process portion 904). In certain embodiments, analyzing contact information can include analyzing at least one of a phone number, an address, and an affiliation (process portion 910).

For example, in some cases, a time zone can be determined or suggested based on the phone number (e.g., a country code and/or area code). In many cases, a time zone can be determined or suggested based on an address or physical location associated with the contact. The address can include a full address, including street address, city, state, and country or be a simple location (e.g., a city, a state, and/or country). In certain embodiments, if a time zone can not be determined from the address or location, a time zone for a nearby city (e.g., major city) and/or multiple time zones associated with an associated country can be suggested. In still other cases, a time zone can be determined or suggested based on a contact's affiliation. For example, a contact's affiliation can include an organization, company, or company group to which the contact belongs or works. The affiliation can have a physical location (e.g., a location of a company) that can be used to determine or suggest a time zone. In certain situations, the contact identification can include a general contact, for example, a group in a company rather than an individual.

The process 900 can further include determining a time zone for the contact based on the analysis of the contact information (process portion 906). In certain embodiments, determining a time zone for the contact can include suggesting multiple time zones based on the analysis of the contact information (process portion 912) and selecting one of the multiple suggested time zones or manually entering a non-suggested time zone based on the manual analysis of the contact information (process portion 913). In still further embodiments, the process 900 can include storing the time zone for the contact (process portion 908). If the time zone is stored, it can later be retrieved, for example, when a contact (e.g., a participant identification) is selected from a list of contacts during a scheduling process.

In certain cases, a contact may spend significant amounts of time in two or more locations. Accordingly, it can be desirable to have multiple time zones associated with the contact. For example, when a user is scheduling an event, the user can be aware of the multiple time zones associated with the participant and/or choose between the multiple time zones for the participant based on knowing the participant is at a selected location.

Therefore, in certain embodiments, a computer-implemented process 1000 for associating time zone information with a contact in an information management program application can include selecting a contact (process portion 1002) and analyzing contact information associated with the contact (process portion 1004). The method can further include determining a first time zone for the contact based on the analysis of the contact information (process portion 1006) and determining an alternate time zone for the contact based on the analysis of the contact information (process portion 1008). The method can still further include storing the first time zone for the contact (process portion 1010) and storing the alternate time zone for the contact (process portion 1012).

FIG. 11 is a partially schematic illustration of an information management program application display of contact information in accordance with an embodiment of the invention. FIG. 12 is a partially schematic illustration of another information management program application display of contact information in accordance with another embodiment of the invention. In FIG. 11, a first time zone is associated with a first phone number, a first address, and a company with which the contact is associated. An alternate time zone is associated with a second phone number and a second address. Accordingly, if a user selects the contact as a participant during a scheduling process, the user is aware of the different time zones and, in certain embodiments, can choose the appropriate time zone to use when scheduling an event. In FIG. 12, a first time zone and an alternate time zone are associated with the contact, but neither is displayed as being associated with specific contact information. Again, a user that selects the contact is made aware of the two time zones and, in certain embodiments, can choose the appropriate time zone to use when scheduling an event. In other embodiments, only one time zone is assigned to a contact. In certain embodiments, the time zones can be adjusted for changes between Standard Time and Daylight Savings Time.

Figure 13:
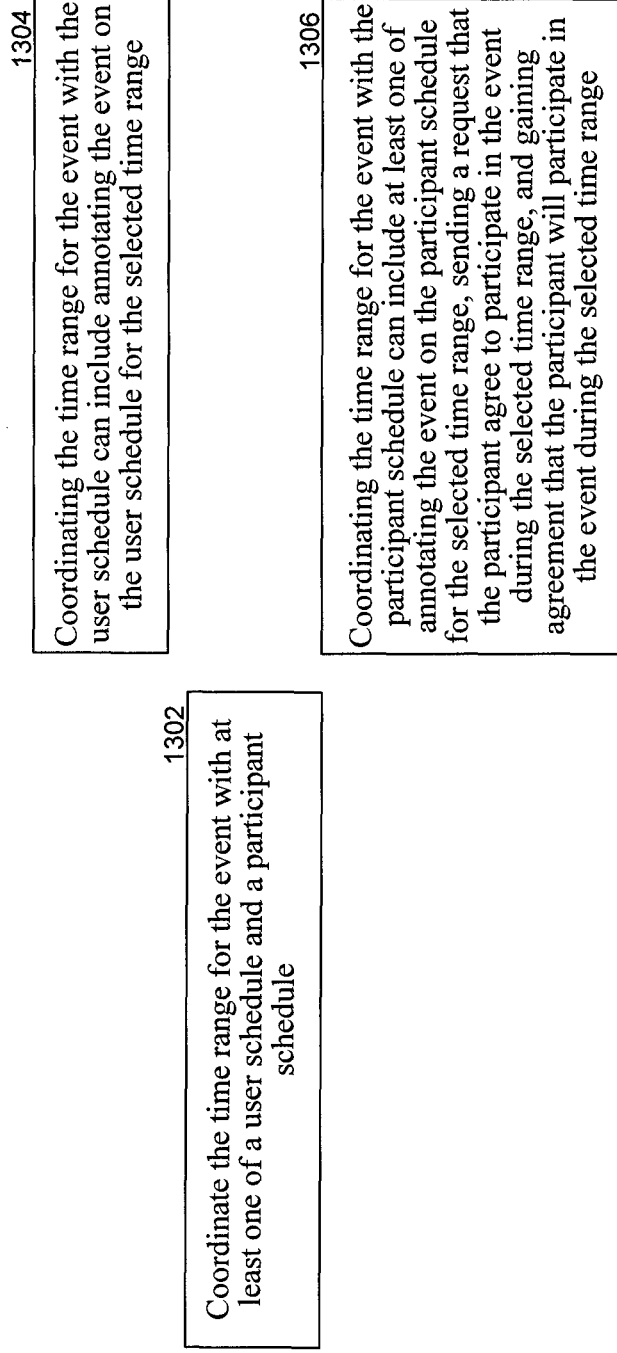
FIG. 13 is a flow diagram illustrating still other embodiments of the computer-implemented scheduling process shown in FIG. 2.

As shown in FIG. 13, the computer-implemented scheduling process shown in FIG. 2 can further include coordinating the time range for the event with at least one of a user schedule and a participant schedule (process portion 1302). In certain embodiments, coordinating the time range for the event with the user schedule can include annotating the event on the user schedule for the selected time range (process portion 1304). In other embodiments, coordinating the time range for the event with the participant schedule includes at least one of annotating the event on the participant schedule for the selected time range, sending a request that the participant agree to participate in the event during the selected time range, and gaining agreement that the participant will participate in the event during the selected time range (process portion 1306).

One feature of some of the embodiments described above is that a user can schedule an event while being aware of availability information relative to time zones associated with each expected participant. Additionally, in certain cases, the user can be aware of certain scheduling preferences or time preference periods during which events should or shouldn't be scheduled. These features can allow users to schedule events while being sensitive to time zone differences, availability, and other preferences. An advantage of these features is that the scheduling process can be simplified and require less communication/negotiation between the participants to find a suitable time that accommodates time zone differences and/or scheduling preferences as compared to current systems.

Another feature of some of the embodiments described above is that a time zone can be associated with a contact in an information management program application by analyzing contact information. This feature can aid a user in determining time zone information without having to conduct research and/or querying the contact. An advantage of this feature is that time and effort can be saved when scheduling an event or attempting to determine a time zone for a contact.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A computer-implemented scheduling method, comprising:
    identifying a time difference between a participant time zone and a user time zone, wherein the participant time zone is associated with a participant and the user time zone is associated with a user scheduling an event;
    displaying availability information for the participant;
    selecting a time range for the event;
    graphically displaying, in relationship to the user time zone, the selected time range for the event relative to the availability information for the participant and a selected time preference period and a time period to be avoided for the participant in relationship to the user time zone; and
    determining whether the selected time range is during a selected time preference period and whether the selected time range is during a time period to be avoided for the participant in relationship to the participant time zone.

2. The method of claim 1, further comprising:
    displaying availability information for a plurality of users, where each user is enabled to have their own user time zone; and
    indicating that the selected time range is during a selected time preference period for the plurality of users in relationship to their user time zones and indicating when the selected time range is during a time period to be avoided.

3. The method of claim 1, further comprising coordinating the time range for the event with at least one of a user schedule and a participant schedule, where the coordinating comprises at least one of selecting a first available time slot for all users and participants, selected based on received user input, or selected based on a received input from a second user with a coordination permission indication from the user.

4. A computer-implemented scheduling method, comprising:
    receiving a manual selection of a participant time zone if none is already specified;
    identifying a difference between a participant time zone and a user time zone, wherein the participant time zone is associated with a participant and the user time zone is associated with a user scheduling an event;

displaying at least one of availability information for the participant, a time period to be avoided, and a selected time preference period for the participant; and selecting a time range for the event.

5. The method of claim 4 wherein identifying the difference between the participant time zone and the user time zone includes graphically displaying a time difference between the participant time zone and the user time zone to the user through use of a graphical calendar.

6. The method of claim 4, further comprising coordinating the time range for the event with at least one of a user schedule and a participant schedule, where the user and the participant can add additional users and participants for the event.

7. The method of claim 4, further comprising coordinating the time range for the event with at least one of a user schedule and a participant schedule, wherein:

coordinating the time range for the event with the user schedule includes annotating the event on the user schedule for the selected time range, wherein annotating the event includes providing a text notification that an event conflicts or does not conflict with a selected time preference for a user or participant; and coordinating the time range for the event with the participant schedule includes at least one of annotating the event on the participant schedule for the selected time range, sending a request that the participant agree to participate in the event during the selected time range, and gaining agreement that the participant will participate in the event during the selected time range.

8. The method of claim 4 wherein displaying at least one of the availability information for the participant and the selected time preference period for the participant includes at least one of graphically displaying the availability information for the participant relative to the participant time zone and graphically displaying the selected time preference period for the participant relative to the participant time zone.

9. The method of claim 4, further comprising:

storing the user time zone;

storing the participant time zone; and storing at least one of the availability information for the participant, the selected time preference period for the participant, availability information for the user, and a selected time preference period for the user.

10. The method of claim 4 wherein the participant includes a first participant and the participant time zone includes a first participant time zone, and wherein the method further comprises:

identifying a difference between an additional participant time zone and at least one of the first participant time zone and the user time zone, wherein each additional participant time zone is associated with an additional participant;

displaying at least one of availability information for each of the additional participants and a selected time preference period for each of the additional participants; and selecting a time range for the event, wherein the selected time range is a time range where each participant and user has indicated a selected time preference period or has not indicated a lack of availability.

11. The method of claim 4 further comprising displaying at least one of availability information for the user and a selected time preference period for the use, and wherein the selecting a time range of the event includes selecting a time range inside the times indicated by the user availability information.

12. The method of claim 4, further comprising selecting a participant identification associated with the participant from a list of contacts, wherein the selecting of a participant identification includes receiving a manual entry of participant identification if the participant identification is not already in the list of contacts.

13. The method of claim 4, further comprising collecting the participant time zone.

14. The method of claim 4, further comprising:

collecting the participant time zone, wherein collecting the participant time zone includes at least one of receiving a manually entered a time zone, receiving a manually selected time zone from a list of time zones, retrieving a stored time zone associated with the participant, accepting a time zone associated with a phone number of the participant, accepting a time zone associated with an address of the participant, and accepting a time zone associated with an affiliation of the participant; and wherein the displaying availability information for the participant comprises reviewing a selected time preference period for the participant, wherein the selected time preference period for the participant corresponds to a time period identified by the participant.

15. The method of claim 4 further comprising:

selecting at least one of a time preference period for the participant in relationship to the participant time zone and a time preference period for the user in relationship to the user time zone; and wherein identifying the time difference is performed by the processor executing instructions stored in the memory.

16. The method of claim 4 wherein displaying the selected time preference period includes indicating the selected time preference period for the participant in relationship to the participant time zone.

17. The method of claim 4, further comprising indicating a selected time preference period for the user in relationship to the user time zone.

18. The method of claim 4 wherein displaying the selected time preference period includes indicating that the selected time range is during the selected time preference period for the participant in relationship to the participant time zone or is not during the selected time preference period for the participant in relationship to the participant time zone.

19. The method of claim 4, further comprising indicating that the selected time range is during a selected time preference period for the user in relationship to the user time zone or is not during the selected time preference period for the user in relationship to the user time zone.

20. The method of claim 4 further comprising suggesting a time range based on at least one of the availability information for the participant, availability information for the user, the participant time zone, the user time zone, a selected time preference period for the participant, and a selected time preference period for the user.

21. A computer-implemented method for associating time zone information with a contact in an information management program application, comprising:

selecting a contact;

analyzing contact information associated with the contact;

determining a time zone for the contact based on the analysis of the contact information and determining whether the contact information is associated with a time range to be avoided; and receiving a manual setting of a participant time zone if none can be determined from the analysis of the contact information.

22. The method of claim 21, further comprising storing the time zone for the contact.

23. The method of claim 21 wherein analyzing contact information includes analyzing at least one of a phone number, an address, and an affiliation.

24. The method of claim 21 wherein determining a time zone for the contact includes determining a first time zone for the contact, and wherein the method further comprises:
    determining an alternate time zone for the contact based on the analysis of the contact information; and
    storing the alternate time zone for the contact.

25. The method of claim 21, wherein determining a time zone for the contact includes:
    suggesting multiple time zones based on the analysis of the contact information; and
    selecting one of the multiple suggested time zones or receiving a manually entered non-suggested time zone based on the analysis of the contact information.

26. A system for scheduling, comprising:
    a processor identifying a difference between a participant time zone and a plurality of user time zones received at a memory resource accessible by the processor, wherein the participant time zone is associated with a participant and the plurality of user time zones are associated with a plurality of users scheduling an event;
    a display device displaying at least one of availability information for the participant, a selected time preference period for the participant, and a time period to be avoided; and
    the processor determining a time range for the event.

27. The system of claim 26, the display device graphically displaying a time difference between the participant time zone and the plurality of user time zones to the users.

28. The system of claim 26, the processor coordinating the time range for the event with at least one of the plurality of users schedules and a participant schedule.

29. The system of claim 26, the display device displaying at least one of:
    the availability information for the participant;
    the selected time preference period for the participant;
    the availability information for the participant relative to the participant time zone; or
    the selected time preference period for the participant relative to the participant time zone.

30. The system of claim 29, wherein:
    the processor determines whether the selected time range is during a selected time preference period and whether a selected time range is during a time period to be avoided for the participant relative to the participant time zone; and
    the memory resource stores at least one of:
    the plurality of users time zones;
    the participant time zone;
    the availability information for the participant;
    the selected time preference period for the participant;
    availability information for the plurality of users, or
    the selected time preference period for the plurality of the users.

31. The system of claim 26, wherein:
    the processor determines a difference between an additional participant time zones; and
    the display device displays at least one of availability information for each of the additional participants and a selected time preference period for each of the additional participants.

32. The system of claim 26, the display device displaying at least one of availability information for the plurality of users or the selected time preference period for the plurality of users.

33. The system of claim 26, the processor selecting a participant identification associated with the participant from a list of contacts.

34. The system of claim 26, the processor collecting the participant time zone.

35. The system of claim 26, the processor selecting at least one of a time preference period for the participant relative to the participant time zone or a time preference period for the plurality of users relative to the user time zones through use of a graphical calendar.

36. The system of claim 26, the processor suggesting a time range based on at least one of the availability information for the participant, availability information for the plurality of users, the participant time zone, the user time zones, the selected time preference period for the participant, or the selected time preference period for the plurality of users.

37. A system for performing scheduling, comprising:
    a processor configured to:
    select a contact from a memory resource;
    analyze contact information associated with the contact;
    determine a time zone for the contact based on the analysis of the contact information;
    determine whether the contact information is associated with a time range to be avoided; and
    set a participant time zone in the memory resource if none is already specified.

38. The system of claim 37, the processor configured to store the time zone for the contact in the memory resource.

39. The system of claim 37, the processor configured to:
    determine a first time zone for the contact;
    determine an alternate time zone for the contact based on the analysis of the contact information; and
    store the alternate time zone for the contact in the memory resource.

* * * * *